Aug. 18, 1970                                             3,524,694

FLAT-FIELD MICRO-OBJECTIVE WITH INCREASED MAGNIFICATION

Filed Oct. 4, 1966

INVENTOR
WALTER KLEIN
BY
ATTORNEY.

United States Patent Office 3,524,694
Patented Aug. 18, 1970

3,524,694
FLAT-FIELD MICRO-OBJECTIVE WITH
INCREASED MAGNIFICATION
Walter Klein, Wissmar, Germany, assignor to
Ernst Leitz GmbH, Wetzlar, Germany
Filed Oct. 4, 1966, Ser. No. 584,230
Claims priority, application Germany, Nov. 26, 1965,
L 52,236
Int. Cl. G02b 21/02, 9/62, 9/64
U.S. Cl. 350—177　　　　　　　　　　　　　　　1 Claim

ABSTRACT OF THE DISCLOSURE

A flat-field micro-objective for a microscope, having two optical sections, the first section of positive refraction chromatically compensated and provided with an air gap of defined dimension between two cemented members of said first section, the second section having the negative refraction dimensioned in proportion to the effective aperture of the cemented members of the first section, the spacing between the first and second sections being at least five times the focal length of the objective.

FIELD OF THE INVENTION

The present invention relates to an optical system for microscopes and more particularly to improvements in the multi-lens construction of micro-objectives.

SUMMARY OF THE INVENTION

In summary, the microscope immersion objective of this invention comprises a first section of the system with a positive power of refraction on the object side and a second section with a negative power of refraction on the picture side. The first section on the object side consists, as seen in the direction of the light, of the front lens, two non-cemented positive lens members and further, cemented lens means for chromatic correction, the air gaps of these further, cemented members being each smaller than the central thicknesses of the members following these gaps. The spacing of the first and second sections of the system from each other is larger than five times the total focal length, and the power of refraction of the second section on the picture side has a negative refractive power dimensioned such that the exit height of the aperture ray from the last surface is smaller than the two-thirds of the height of penetration of the aperture rays through the surfaces of the cemented members of the first section of the system on the object side.

Preferably, the second section of the system on the picture side consists of a cemented negative member; the cemented members of the first section on the object side consist each of respectively two individual lenses of opposite refractive power cemented together, the cemented members having their positive lenses facing each other; and three cemented members are provided in the first section of the system on the object side for apochromatic correction.

DESCRIPTION OF THE PRIOR ART

When producing microscope objectives, particularly great difficulties are encountered with strong immersion objectives. Such difficulties are caused by the small lenses on the object side, in particular by the very small front lenses of the objectives. The previously known standard types of strong immersion objectives, illustrated, for example, in the book by Karl Michel, "Grundzuge der Mikrophotographie" (Outlines of Microphotography), 2nd edition, 1943, page 96, FIG. 101, exhibit, in the image errors, a very large curvature of the picture area and astigmatic undercompensation. In objectives of this type having enlargements of about 100:1 and a numerical aperture of about 1.30, the Petzval sum is between +0.60 and +0.70.

These small lenses are very expensive to manufacture and cause far greater mounting difficulties than the other lenses of the objectives. Since usage of these small lenses to beyond their hemisphere is required because of the large apertures, they must be clamped into the mounting part only from the outside. However, this means that they can not be used for polarization microscopes in particular, since the type of mounting causes tensions or stresses in the front lens. Besides, the small free object spacing of about 0.10 mm. or smaller is disadvantageous.

Planar objectives, wherein the Petzval sum could be lowered, are also known. Examples thereof are described in German Pat. No. 977,067. However, these objectives require very many lenses having shapes which are very difficult to produce, such as, for example, thick negative meniscus lenses.

Cementing the front lenses of microscope objectives to thin planar platelets or lamellas is also known, making possible a better mounting of these front lenses. However, this has the disadvantage that the free object distance, which is small to begin with, is generally decreased even more.

It is an object of the present invention to provide microscope immersion objectives wherein the above-described disadvantages are at least substantially avoided, and wherein particularly the front lens can be relatively large.

BRIEF DESCRIPTION OF THE DRAWINGS

Other aspects of the invention will become apparent from the embodiments of the invention illustrated in the drawings wherein.

DESCRIPTION OF THE PREFERRED EMBODIMENT

Figure 1:
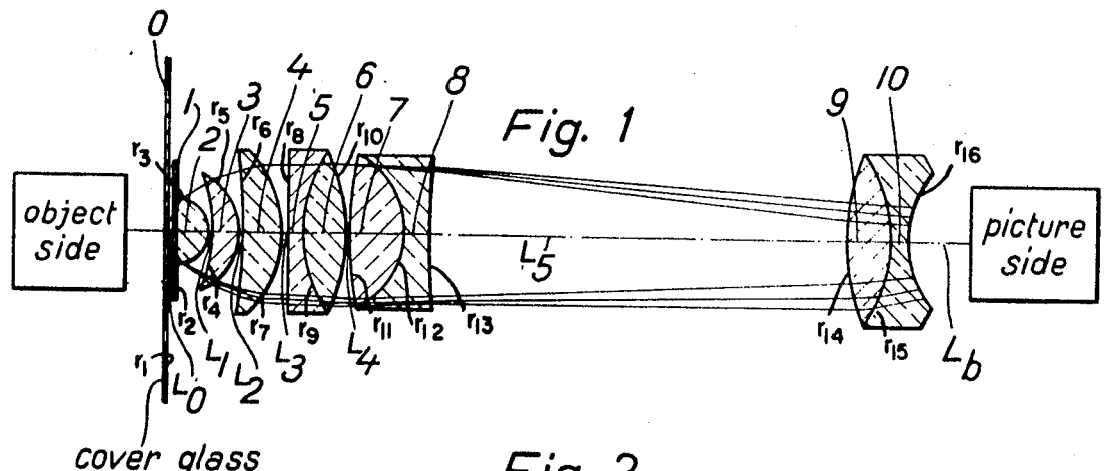
FIG. 1 is a cross-sectional view of one objective of this invention.

This object is accomplished, according to this invention, by having the objectives constructed from an element of the system with a positive power of refraction on the object side and an element with negative power of refraction on the picture side. The spacing between these two elements is larger than five times the total focal length of the system. Referring to FIG. 1, the elements on the object side comprise the front lens 2, two individual lenses 3, 4 following this front lens and having a positive power of refraction, and further cemented members 5–6 and 7–8 providing mainly chromatic correction.

Figure 3:
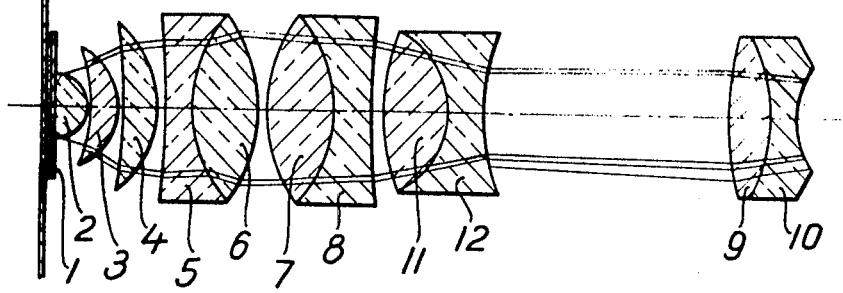
FIG. 3 shows a cross-sectional view of a preferred embodiment of the objective of this invention with apochromatic correction.

The air gaps of the cemented members are respectively smaller than the central thickness of the following member. Furthermore, the power of refraction of the negative element of the system on the picture side is dimensioned so that the exit height of the aperture rays at the surface which is the last one as seen in the light direction, is smaller than two-thirds of the heights of penetration of these rays through the surfaces of the cemented members. The portion of the system on the picture side consists preferably of a cemented negative member 9–10. For the purpose of chromatic correction, there are preferably employed two members 4–5 and 6–7 comprising respectively two individual lenses of opposite refractive power, cemented together, with the positive lenses 5 and 6 facing each other. As shown in FIG. 3, for the apochromatic correction, it is advantageous to provide yet a further member 11–12 consisting of two individual lenses 11 and 12 cemented together, in order to be able to use glass pairs or crystals favorable in accordance with the Theta condition. The front lens 2 can suitably be cemented onto a plane-paralled platelet 1; the material used for this platelet 1 can be different from that of the front lens 2.

The inventor mathematically analyzed the optimal construction of the novel objective developed, the different optical parameters $f_1, f_2 \ldots r_3, r_4 \ldots d_1, d_2 \ldots L_0, L_1 \ldots$ investigated a mathematical model of the optical structure and compiled the characteristic optical values of the objective $L_b, f'$.

The resulting data for an objective according to the invention are set forth in Table A.

TABLE A

| | | $n_d$ | $v_d$ |
|---|---|---|---|
| $r_1 = \infty$ | $d_0 = 0.17$ | 1.52278 | 58.50 |
| | $L_0 = 0.305$ | 1.51532 | 49.40 |
| $r_2 = \infty$ | $d_1 = 0.30$ | 1.51823 | 58.96 |
| $r_3 = -1.519$ | $d_2 = 1.68$ | 1.52542 | 64.55 |
| $r_4 = -10.740$ | $L_1 = 0.09$ | | |
| $r_5 = -3.630$ | $d_3 = 1.44$ | 1.48523 | 81.61 |
| $r_6 = -81.810$ | $L_2 = 0.07$ | | |
| $r_7 = -6.450$ | $d_4 = 2.39$ | 1.48523 | 81.61 |
| $r_8 = \infty$ | $L_3 = 0.07$ | | |
| $r_9 = 8.240$ | $d_5 = 1.30$ | 1.75692 | 31.80 |
| $r_{10} = -10.263$ | $d_6 = 2.80$ | 1.48523 | 81.61 |
| $r_{11} = 20.569$ | $L_4 = 0.20$ | | |
| $r_{12} = -4.954$ | $d_7 = 3.50$ | 1.48523 | 81.61 |
| $r_{13} = 151.056$ | $d_8 = 2.0$ | 1.53172 | 48.87 |
| $r_{14} = 15.314$ | $L_5 = 25.18$ | | |
| $r_{15} = -7.980$ | $d_9 = 2.50$ | 1.67003 | 47.12 |
| $r_{16} = 5.870$ | $d_{10} = 1.10$ | 1.51112 | 60.49 |

$L_b = 151.91$
$f' = 1.7375$
$\beta' = -98.137$
$\Sigma P = +0.3390$
$\Sigma \Gamma = -0.0981$ Various symbols used in the table represent:

$r_1, r_2 \ldots r_{16}$ ----- The radius of curvature of individual lenses.
$f$ ----- The focal distance or length of the objective.
$f_1, f_2 \ldots f_{10}$ ----- The focal distances of the individual lenses.
$d_1, d_2 \ldots d_{10}$ ----- The thickness of the individual lenses measured in the optical axis.
$L_0, L_1 \ldots L_5$ ----- The air gaps between the individual corresponding optical members.
$L_b$ ----- The distance of the image from the objective.
$n_d$ ----- The indices of refraction of the material of the individual lenses.
$v_d$ ----- The indices of dispersion of the material of the individual lenses.
$\beta'$ ----- The optical magnification of the objective.
$\Sigma P$ ----- The Petzval sum of the objective.
$\Sigma \Gamma$ ----- The Seidel's sum representing the astigmatismus of the objective.

Figure 2:
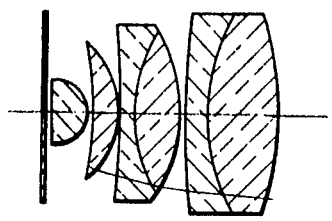
FIG. 2 shows a cross-sectional view of a prior art device.

FIG. 1 illustrates a cross-sectional view of the objective described in foregoing Table A. The reference characters $r_0$ to $r_{16}$ and $L_0$ to $L_5$ in the drawing correspond to those in Table A. The subscripts of the thickness $d$ refer to the corresponding numbered lens elements in FIG. 1. In this example, the Petzval sum is +0.339, and thus is only about half the Petzval sum in objectives of the standard type, of which FIG. 2 shows a cross section. A further improvement in the curvature of the picture area is attained by the cemented negative member 9–10 provided on the picture side by means of which the astigmatism can be overcorrected, so that, together with the oculars, the tangential dip is approximately level in the full microscopic picture. In the example, $\Sigma \Gamma$ is —0.098, and consequently, the coefficient for the tangential dip $S^{III}$ is +0.045. By this correction, the objectives of the present invention exhibit a very good flattening of the image field, without requiring too large a number of lenses, thereby the individual lenses are easily manufactured. The front lens of this objective is about twice as large as in objectives of the known standard type. The front lens can also be mounted, in a manner known per se, with the use of plane-parallel platelets upon which it is cemented, so that it is free of stress; consequently, the objective can also be advantageously used in polarization microscopes. In spite of the use of a plane-parallel platelet having a thickness of 0.3 mm., there still remains, even when employing a cover glass of a thickness of 0.17 mm., a free object distance of 0.30 mm. For immersion objectives of this strength, such a free object distance is very large.

Various parameters similar to those shown in Table A were analyzed. The individual results were compared and those fulfilling the object of the present invention are chartered in the following Tables B–E inclusive. The individual correction parameters can deviate from the data of Table A within the limits set in detail in Tables B, C, D and E without basically impairing the correction. For the focal lengths of the individual members, the data set forth in Table B apply. These data are based on the total focal length of the objective, and the indications for the individual members are in accordance with the indicia applied to each lens in FIG. 1.

TABLE B $f < f_{1,2} < 2.5f$
$4f < f_3 < 8f$
$6f < f_4 < 10f$
$20f < f_{5,6} < \infty$
$20f < f_{7,8} < \infty$
$20f < -f_{9,10} < \infty$ The thickness of the lenses are to be within the limits of Table C.

TABLE C $0.1f < d_1 < 0.5f$
$0.7f < d_2 < 1.5f$
$0.6f < d_3 < 1.3f$
$f < d_4 < 2f$
$0.3f < d_5 < 3f$
$f < d_6 < 3f$
$f < d_7 < 3f$
$0.3f < d_8 < 3f$
$f < d_9 < 3f$
$0.3f < d_{10} < 3f$

For the radii, the statements in Table D apply.

TABLE D $10f < |r_1|$
$10f < |r_2|$
$0.5f < -r_3 < 2f$
$4f < -r_4 < 10f$
$f < -r_5 < 3f$
$15f < |r_6|$
$2.5f < -r_7 < 6f$
$15f < |r_8|$
$3f < r_9 < 8f$
$4f < -r_{10} < 10f$
$6f < r_{11} < 20f$
$2f < -r_{12} < 6f$
$15f < |r_{13}|$
$5f < r_{14} < 15f$
$3f < -r_{15} < 10f$
$2.5f < r_{16} < 6f$

For the optical values of the glass types used, the terms of Table E apply.

TABLE E $1.48 < n_1 < 1.55$    $50 < \nu_1 < 70$
$1.48 < n_2 < 1.55$    $50 < \nu_2 < 70$
$1.40 < n_3 < 1.55$    $50 < \nu_3 < 100$
$1.40 < n_4 < 1.55$    $50 - \nu_4 < 100$
$1.65 < n_5 < 1.85$    $25 < \nu_5 < 45$
$1.40 < n_6 < 1.55$    $50 < \nu_6 < 100$
$1.40 < n_7 < 1.55$    $50 < \nu_7 < 100$
$1.50 < n_8 < 1.65$    $35 < \nu_8 < 70$
$1.60 < n_9 < 1.80$    $30 < \nu_9 < 60$
$1.48 < n_{10} < 1.60$    $40 < \nu_{10} < 70$

I claim:
1. A microscope immersion objective comprising
a front plano parallel cover glass designated 0,
a plano parallel platelet designated 1 and spaced from said cover glass by an axial distance $L_0$,
a plano-convex lens element designated 2, the plano side of which lies in contact with said platelet 1,
a first concavo-convex singlet lens member designated 3 which is rearwardly spaced by an axial distance $L_1$ from said element 2,
a second concavo-convex singlet lens member designated 4 which is spaced by an axial distance $L_2$ from said first concavo-convex lens member 3,
a first doublet axially spaced rearwardly from member 4 at a distance $L_3$, said first doublet comprising a front planno-concave lens element designated 5 which lies in contact with a positive double convex lens element 6,
a second doublet axially spaced rearwardly from said first doublet at a distance $L_4$, said second doublet comprising a front positive double convex lens element designated 7 which lies in contact with a negative double concave lens element 8,
a third doublet axially spaced rearwardly from said second doublet at a distance $L_5$, said third doublet comprising a front positive double convex lens element designated 9 which lies in contact with a negative double concave lens element 10,
the axial thicknesses of the successive lens elements 0 to 10 being designated $d_0$ to $d_{10}$, the radii of the successive surfaces of said lens elements being designated $r_1$ to $r_{16}$ and the minus (—) sign used therewith meaning that the centers of curvature of such refractive surfaces are located toward the front object side of the apex of said surfaces, the refractive indices of the successive lens elements 0 to 10 being designated $n_d$, the Abbe value being designated $\nu_d$, the focal length of the objective being designated $f'$, the distance of the image from the objective being designated $L_b$, the optical magnification of the objective being designated $\beta'$, the Petzval sum of the objective being designated $\Sigma P$, the Seidel's sum representing the astigmatism of the objective being designated $\Sigma \Gamma$, the specific values for the foregoing symbols being approximately given in the table which follows,

|  |  | $n_d$ | $\nu_d$ |
|---|---|---|---|
|  | $d_0 = 0.17$ | 1.52278 | 58.50 |
|  | $L_0 = 0.305$ | 1.51532 | 49.40 |
| $r_1 = \infty$ |  |  |  |
|  | $d_1 = 0.30$ | 1.51832 | 58.96 |
| $r_2 = \infty$ |  |  |  |
|  | $d_2 = 1.68$ | 1.52542 | 64.55 |
| $r_3 = -1.519$ |  |  |  |
|  | $L_1 = 0.09$ |  |  |
| $r_4 = -10.740$ |  |  |  |
|  | $d_3 = 1.44$ | 1.48523 | 81.61 |
| $r_5 = -3.630$ |  |  |  |
|  | $L_2 = 0.07$ |  |  |
| $r_6 = -81.810$ |  |  |  |
|  | $d_4 = 2.39$ | 1.48523 | 81.61 |
| $r_7 = -6.450$ |  |  |  |
|  | $L_3 = 0.07$ |  |  |
| $r_8 = \infty$ |  |  |  |
|  | $d_5 = 1.30$ | 1.75692 | 31.80 |
| $r_9 = 8.240$ |  |  |  |
|  | $d_6 = 2.80$ | 1.48523 | 81.61 |
| $r_{10} = -10.263$ |  |  |  |
|  | $L_4 = 0.20$ |  |  |
| $r_{11} = 20.569$ |  |  |  |
|  | $d_7 = 3.50$ | 1.48523 | 81.61 |
| $r_{12} = -4.954$ |  |  |  |
|  | $d_8 = 2.0$ | 1.53172 | 48.87 |
| $r_{13} = 151.056$ |  |  |  |
|  | $L_5 = 25.18$ |  |  |
| $r_{14} = 15.314$ |  |  |  |
|  | $d_9 = 2.50$ | 1.67003 | 47.12 |
| $r_{15} = -7.980$ |  |  |  |
|  | $d_{10} = 1.10$ | 1.51112 | 60.49 |
| $r_{16} = 5.870$ |  |  |  |

$L_b = 151.91$
$f' = 1.7375$
$\beta' = -98.137$
$\Sigma P = +0.3390$
$\Sigma \Gamma = -0.0981$

References Cited

UNITED STATES PATENTS 3,405,993   10/1968   Aklin et al. _____ 350—177

FOREIGN PATENTS 1,186,234   1/1965   Germany.

DAVID H. RUBIN, Primary Examiner

R. J. STERN, Assistant Examiner

U.S. Cl. X.R.
350—214, 215